(12) United States Patent
Merz

(10) Patent No.: US 7,911,082 B2
(45) Date of Patent: Mar. 22, 2011

(54) SOLAR CELL DEVICE

(75) Inventor: Rainer Merz, Tamm (DE)

(73) Assignee: Universitaet Stuttgart, Stuttgart (DE)

( * ) Notice: Subject to any disclaimer, the term of this patent is extended or adjusted under 35 U.S.C. 154(b) by 617 days.

(21) Appl. No.: 11/932,270

(22) Filed: Oct. 31, 2007

(65) Prior Publication Data

US 2008/0105292 A1    May 8, 2008

Related U.S. Application Data

(63) Continuation of application No. PCT/EP2006/003292, filed on Apr. 11, 2006.

(30) Foreign Application Priority Data

May 2, 2005 (DE) .................. 10 2005 021 152

(51) Int. Cl.
*H02J 1/12* (2006.01)
*H02J 3/00* (2006.01)
*H02J 5/00* (2006.01)
*H03K 19/00* (2006.01)

(52) U.S. Cl. .......................................... 307/45; 307/80

(58) Field of Classification Search .................. 307/45, 307/71, 80, 85
See application file for complete search history.

(56) References Cited

U.S. PATENT DOCUMENTS

| | | | |
|---|---|---|---|
| 4,812,737 A | 3/1989 | Fleck | |
| 4,963,811 A | 10/1990 | Weber | |
| 6,262,558 B1 * | 7/2001 | Weinberg | 320/101 |
| 6,448,489 B2 | 9/2002 | Kimura et al. | |
| 2003/0094931 A1 | 5/2003 | Renyolds | |
| 2005/0051209 A1 | 3/2005 | Choe | |
| 2007/0107767 A1 * | 5/2007 | Hayden et al. | 136/244 |
| 2008/0130326 A1 * | 6/2008 | Kuan | 363/21.14 |

FOREIGN PATENT DOCUMENTS

| | | |
|---|---|---|
| DE | 101 20 595 B4 | 11/2001 |
| EP | 0 319 941 | 6/1989 |
| GB | 2 025 164 A | 1/1980 |

* cited by examiner

*Primary Examiner* — Jared J Fureman
*Assistant Examiner* — Carlos Amaya
(74) *Attorney, Agent, or Firm* — Harness, Dickey & Pierce, P.L.C.

(57) ABSTRACT

The invention provides a solar cell device having a plurality of solar cell modules Z1, Z2, Z3, . . . , Zn, whose voltage outputs ($U_{E1}$, $U_{E2}$, $U_{E3}$, . . . , $U_{En}$) are each coupled via a switching element (T1, T2, T3, . . . , Tn) to a switched voltage converter (12) preferably designed as inverting flyback converter or as step-up converter. Losses due to partial switching off of individual solar cell modules are avoided, the modules being operated independently one from the other. Using the voltage converter (12), the output voltage can be adjusted within wide limits. Using a microprocessor control (16) optimum energy yield of the entire system can be achieved (FIG. 1).

29 Claims, 3 Drawing Sheets

US 7,911,082 B2

SOLAR CELL DEVICE

RELATED APPLICATIONS

This is a continuation application of copending International Application PCT/EP2006/003292 filed on Apr. 11, 2006 which has been published in German language and claims priority of German patent application 10 2005 021 152.6, filed May 2, 2005, the contents of which is fully incorporated by reference herewith.

BACKGROUND OF THE INVENTION

The present invention relates to a solar cell device having at least one solar cell module designed to supply a consumer.

If solar cells are to be used for supplying electric consumers it is necessary as a rule to connect a plurality of solar cells one with the other. Normally, individual solar cells and/or solar cell modules are connected in parallel or in series. In the case of those types of connection shading of individual cells or modules may lead to heavy losses with respect to short-circuit current, no-load voltage and power output. In order to avoid such losses, one normally makes use of connection variants using bypass diodes or coupling diodes.

In principle, if output voltage values higher than those of a single cell and/or a single module are to be obtained, two options are available.

According to a first variant, a number of identical individual cells and/or modules, being as similar as possible, are connected in series to obtain an output voltage equal to an integer multiple of the voltage of a single cell or a single module, the connection being effected especially by monolithic integrated series connection, as is usual for thin-film modules.

Alternatively, it is possible to provide for voltage conversion via energy transformation. In that case, an inductance is employed to store the energy supplied to it via a switching transistor, and to release it later. Depending on the timing of such release of energy, the arrangement so realized is a forward converter or a flyback converter.

If an output voltage not higher than that of the individual cells or of the modules is desired, the cells or modules are connected in parallel.

Series connection of individual solar cells or modules is connected with the disadvantage that the maximum current is determined by the least efficient cell. The least efficient cell is that cell which supplies the least current under given illumination conditions.

When connecting solar cells using the monolithic series connection system undesirable resistances parallel to the individual cell will be produced. In addition, due to differences in illumination, the maximum power output of the connected cells and/or modules will be smaller than or maximally equal to the power output of the weakest cell. Especially when solar cells or solar modules are integrated in garments, for example, for mobile use the different individual cells or modules cannot possibly be illuminated identically. Considering that the input power of the individual cells or modules is very low, the illumination being very poor in most of the cases, such shading losses are extremely problematic. On the other hand, when the cells and/or modules are connected in parallel, compensating currents will be produced between individual cells or modules. Such currents have the effect to adapt the individual voltages because all the individual cells and/or modules necessarily must have the same potential in a parallel connection.

SUMMARY OF THE INVENTION

It is a first object of the present invention to disclose an improved solar cell device wherein the output voltage can be adjusted in a manner that provides considerably low losses.

It is a second object of the present invention to disclose an improved solar cell device which can be easily adapted to various illumination conditions.

It is a third object of the present invention to disclose an improved solar cell device which allows to combine a plurality of different solar cell modules in an intelligent way leading to a high power output with low losses.

It is a forth object of the present invention to disclose an improved solar cell device which allows to adjust the output voltage to a desired value.

These and other objects are solved by the present invention basically by providing a plurality of solar cell modules, each of the outputs of such modules being coupled to a switched voltage converter via a switching element.

Such a system generally avoids any switching losses that may occur in the case of series connections or cascade connections. In contrast, each solar cell module can be suitably controlled in this case, via its own switching element, to supply its power to the voltage output.

The switched voltage converter may be designed as flyback converter or as forward converter, for example.

In this case, designing it as inverting flyback converter (also known as inverse step-up converter or back-boost converter) would be imaginable. This provides the advantage that output voltages higher than the input voltages can be achieved. In addition, it is possible to configure the switching elements of the solar cell modules as part of the voltage converter in which case no additional switching elements will be required for the voltage converter.

According to an alternative design, the inverting flyback converter comprises a dedicated switching element at its input.

This provides the advantage that the timing of the flyback converter can be decoupled from the timing of the solar cell module.

According to another variant of the invention, the flyback converter is designed as step-up converter (also known as step-up converter or as boost converter).

Preferably, the individual solar cell modules are sequentially driven one after the other via the switching elements.

If preferred for the respective application, a capacitor may be connected in parallel to the useful voltage output at the output of the voltage converter.

The useful voltage output may be directly connected to a consumer. Alternatively, or additionally, an accumulator may be connected to the useful power output.

According to a preferred further development of the invention, the voltage converter comprises a switching element (for example in the form of a FET) for tapping a rectified voltage.

That switching element may be arranged in parallel to a rectifier diode of the voltage converter. The switching element is driven in such a way that the circuit will be completed when the diode is in its conductive state.

Under certain circumstances, the rectifier diode may also be omitted.

This allows losses of the rectifier diodes, which are usually employed especially in low-voltage and extra low-voltage applications, to be reduced. The voltage drop across the bulk resistance of the switching element should be smaller in this case than the voltage drop across the diode. The switching element (the transistor) should be operated in the saturation region for this purpose.

According to a further embodiment of the invention, at least one of the solar cell modules is designed as a single solar cell.

According to another embodiment of the invention, at least one solar cell module comprises a plurality of interconnected solar cells.

In this case, each solar cell can be driven separately via a switching transistor, or a plurality of solar cells can be driven jointly by a single switching transistor. The design used depends on the respective application although the overall cost is of course influenced by the number of switching transistors employed.

According to a preferred further development of the invention, the switching transistors comprise control inputs that are driven by a central control, preferably a microcontroller.

It is possible in this way to optimize the switching times of the individual switching transistors in order to obtain the desired output voltage and, at the same time, to guarantee the highest possible efficiency.

Preferably, the switching transistors are sequentially controlled as a function of the performance characteristics of the solar cell modules. For this purpose, data characteristic of the performance of the individual modules can be stored in an internal storage by the microprocessor. This allows the entire system to be optimally adapted to any production variations of the performance characteristics of the individual solar cells or modules. Fully shaded or defective cells or modules can also be switched off completely, if required.

According to a further embodiment of the invention, the central control is designed to control the ratio of on-times to the ratio of off-times of the switching transistors.

It is possible in this way, by varying the duty factor, to set the output voltage to a desired nominal value within certain limits.

In selecting the switching times the capacitance of the individual solar cell modules should be accounted for. It may be of advantage in this connection to connect an additional capacitor in parallel to the voltage output of one or more of the solar cell modules.

The switching transistors preferably are designed as field effect transistors, especially as MOS-FETs.

This guarantees an especially low-loss circuit.

According to a further embodiment of the invention, at least one solar cell is integrated with at least one integrated switching transistor.

By integrating solar cells and switching transistors it is possible to achieve additional improvements in efficiency. It may also be useful to design an entire series of solar cells with their associated switching transistors as a single integrated circuit. If desired, parts of the flyback converter, or the entire flyback converter, could be integrated as well.

Further, it is also imaginable to implement a combination with the microprocessor control on one chip.

According to one variant of the invention, the number of solar cells or solar modules may be limited to a single one.

In that case, which preferably is limited to especially simple and low-cost embodiments for the supply of small loads, a higher efficiency is achieved by the switching element compared with conventional arrangements.

It is understood that the features of the invention mentioned above and those yet to be explained below can be used not only in the respective combination indicated, but also in other combinations or in isolation, without leaving the scope of the invention.

BRIEF DESCRIPTION OF THE DRAWINGS

Further features and advantages of the invention will become apparent from the description that follows of a preferred embodiment of the invention, with reference to the drawing. In the drawing.

DETAILED DESCRIPTION OF THE PREFERRED EMBODIMENTS

Figure 1:
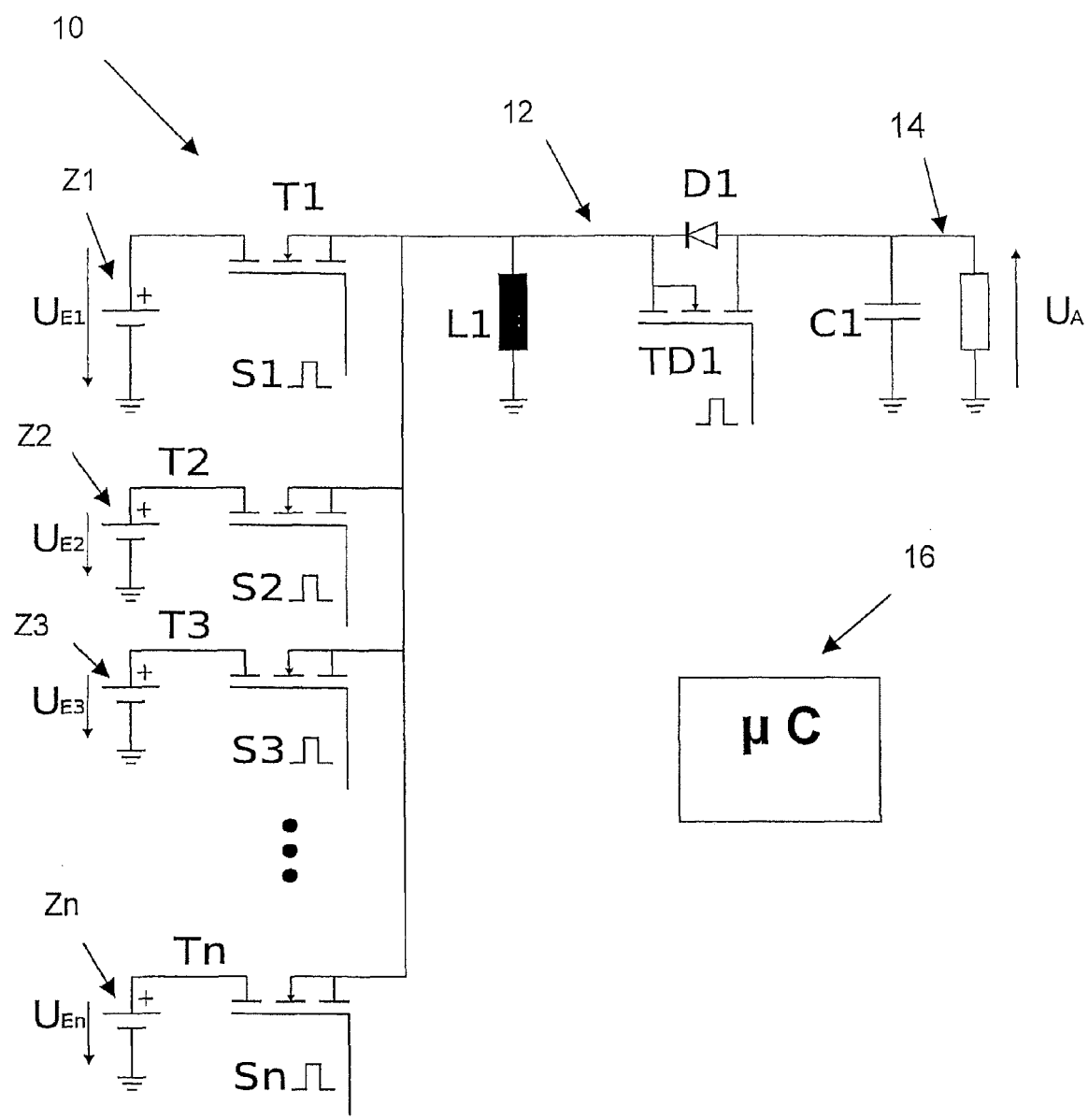
FIG. 1 shows a circuit diagram of a solar cell device according to the invention.

In FIG. 1, a solar cell device according to the invention is shown diagrammatically and is indicated generally by reference numeral 10.

The solar cell device 10 comprises a plurality of solar cell modules Z1, Z2, Z3, . . . , Zn. In the illustrated example, each solar cell module Z1, . . . to Zn is a solar cell that supplies a voltage $U_{E1}$, $U_{E2}$, $U_{E3}$, . . . , $U_{En}$. The output of each solar cell module Z1, Z2, Z3, . . . , Zn is coupled to a flyback converter 12 via a switching element, preferably designed as a FET or a MOS-FET.

The flyback converter 12 is an inverting flyback converter, whose input voltage is supplied to an inductivity L1 in the form of a coil. The voltage of the coil L1 is tapped by a rectifier diode D1 and is supplied to a capacitor C1 and a useful voltage output 14 where the useful voltage $U_A$ drops, being used by a connected consumer. An accumulator, arranged for being recharged through the flyback converter 12, may be connected in parallel to the capacitor C1.

A switching transistor TD1 is connected in parallel to the rectifier diode D1 in support of the rectifier diode D1.

A central control in the form of a microprocessor 16, which is connected to the control inputs of the switching elements T1, T2, T3, . . . , Tn and of the switching element TD1, serves for controlling the entire system.

The switching elements T1, T2, T3, . . . , Tn are sequentially driven by the microprocessor 16 to ensure both cycling of the flyback converter 12 and suitable selection of the solar cell modules Z1, Z2, Z3, . . . , Zn depending on the respective performance characteristics. During the isolation phases, the inherent capacitance is recharged by the respective solar cell modules Z1, Z2, Z3, . . . , Zn. Depending on the properties of the respective solar cell modules Z1, Z2, Z3, . . . , Zn an additional capacitance in the form of a capacitor may be connected in parallel to the respective solar cell module.

The additional switching element TD1, provided parallel to the rectifier diode D1, reduces the losses of the element which is a special advantage in low-voltage and extra low-voltage applications. The voltage drop across the bulk resistance of the switching element TD1 may be smaller in this case than the voltage drop across the diode. The switching elements TD1, T1, T2, T3, . . . , Tn should be operated in the saturation region for this purpose.

Figure 2:
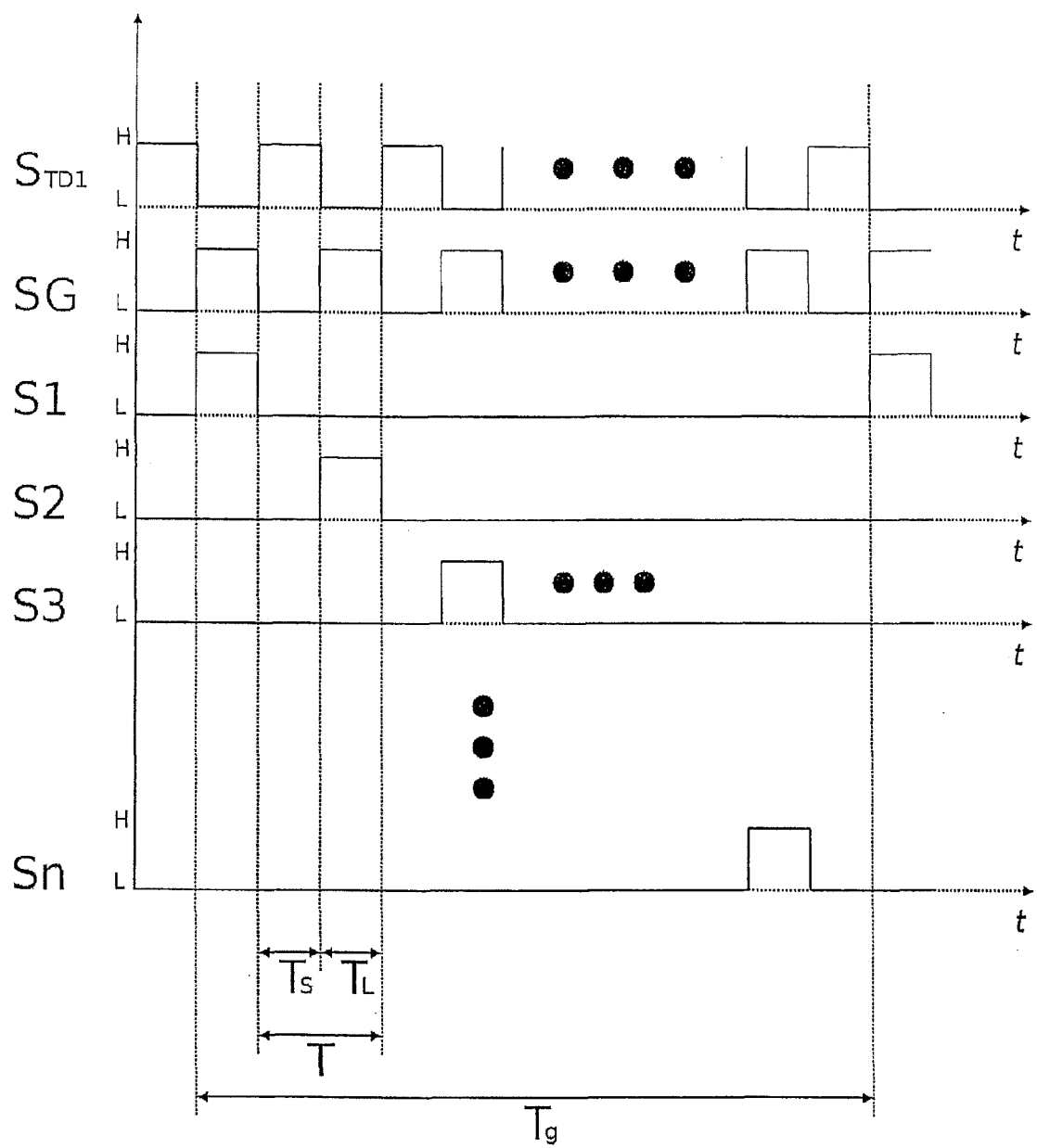
FIG. 2 shows a diagrammatic representation of the control signals for sequentially driving the switching transistors used.

One way of cycling the solar cell modules Z1, Z2, Z3, . . . , Zn via a suitable control software is illustrated in FIG. 2 by way of example.

In the simplest of all cases all solar cell modules Z1, Z2, Z3, ..., Zn are sequentially connected in series, and the on-time $T_S$ and the off-time $T_L$ of each solar cell module are identical.

The switching element TD1 parallel to the rectifier diode D1 must be conductive every time the diode D1 is required to complete the circuit to keep up the current flow in the inductance L1. This is the case every time all switching elements T1, T2, T3, ..., Tn are in their blocking state. Under certain circumstances, the diode D1 may be completely omitted.

Now, the microprocessor 16 advantageously detects the performance characteristics of the different solar cell modules Z1, ..., Zn and stores them in an internal storage. Using the control software, the states of the different solar cell modules T1, ..., Tn can now be detected via the lock-out and/or the switching times of the switching elements T1, ..., Tn so that the respective cell can be selected more often or for a longer time than the other cells. This permits the whole system to be optimally adapted to the illumination conditions and to production variations in the characteristics of solar cell modules. Completely shaded or defective solar cell modules can be detected during that process and can be selected less frequently or can be switched off completely if desired. The switching frequency f=1/(T1+ ... +Tn) of the circuit depends on the number of solar cell modules Z1, ..., Zn and on the inherent capacitance of those modules. Optimum switching times can be determined for each application.

In selecting the switching times, the cell capacitance should be taken into consideration. If high switching frequencies are used, possible high frequency effects, such as surge impedances of cells, must be taken into consideration as well.

Considering that the circuit operates on the transformer principle, the output voltage $U_A$ can be adjusted within certain limits to desired values above and below the individual input voltages $U_{E1}, ..., U_{En}$. It is only necessary for this purpose to adapt the duty factor, i.e. the ratio between $T_L$ and the total duration T of the respective switching cycle. Increasing the duty factor has the effect to increase the output voltage.

Given the fact that the different solar cell modules do not influence one another, any losses due to illumination differences or different characteristics are excluded. Power losses due to coupling and bypass diodes, as used in the prior art, are avoided.

As the rectifier diode D1 and the respective parallel switching element TD1 are in the conducting direction when the control is switched off and a previously charged accumulator is connected to the output, discharging of the accumulator is kept low.

It is understood that, as discussed before, each solar cell module Z1, Z2, Z3, ..., Zn may be represented by a single solar cell or that a plurality of solar cells may be combined to one solar cell module which is connected to the flyback converter via a switching element.

Further, it is understood that depending on the desired degree of integration an integrated design of the switching elements and of the respective solar cell modules may be selected, in which case a plurality of solar cells with their respective switching elements may be arranged on a single chip, or the voltage converter or the microcontroller may be integrated as well.

Figure 3:
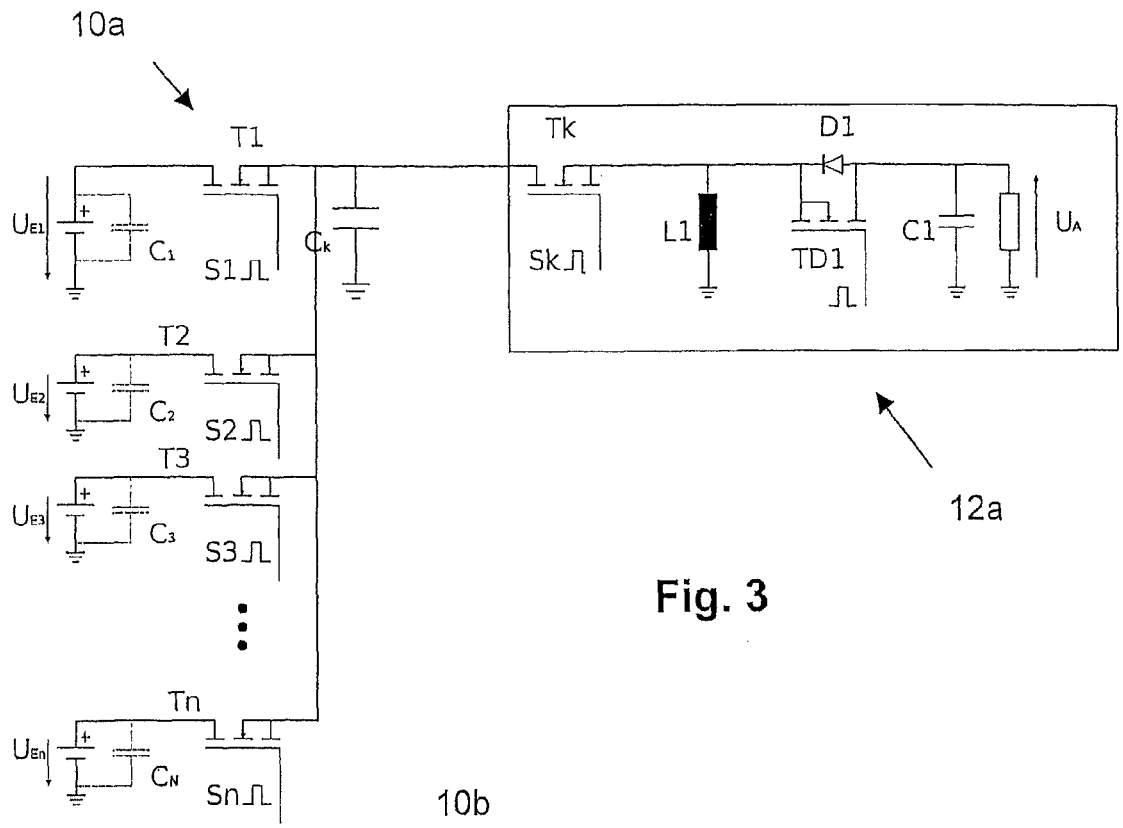
FIG. 3 shows a configuration of a solar cell device according to the invention, in generalized form compared with the configuration of FIG. 1.

FIG. 3 shows a modification of the embodiment of the invention, generalized compared to the embodiment illustrated in FIG. 1 and indicated generally by reference numeral 10*a*. The inverting flyback converter 12*a* comprises a dedicated switching element Tk in this case. This permits decoupling of the switching frequencies of the inverting flyback converter and of the solar cell modules. Further, an imaginary capacitance is indicated parallel to the input of the flyback converter 12*a*. For the rest, the circuit corresponds to the embodiment of FIG. 1 that has been described before.

Figure 4:
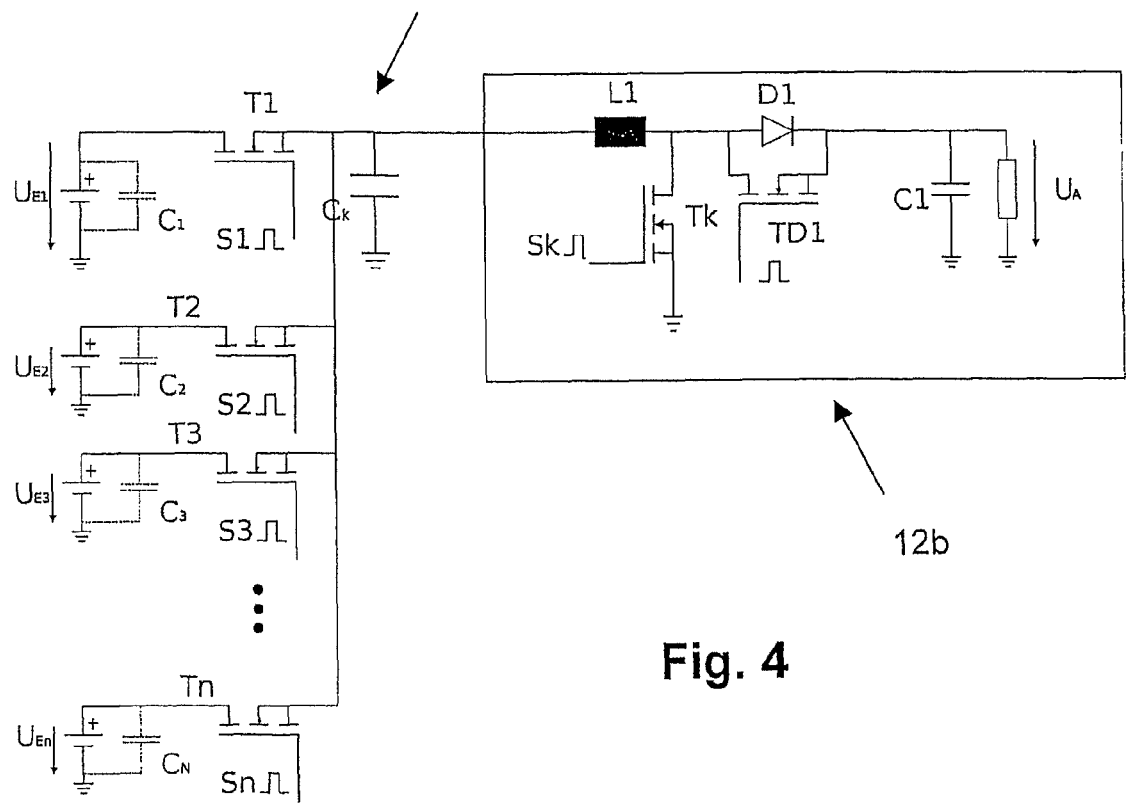
FIG. 4 shows a variant of the embodiment of FIG. 3.

FIG. 4 shows a further modification of the invention where the flyback converter 12*b* is designed as a step-up converter. In this case, no inverted output voltage is obtained, contrary to the before-mentioned embodiment. The output voltage $U_A$ cannot assume values smaller than the input voltage in that case.

The invention claimed is:

1. A solar cell device comprising:
 a plurality of solar cell modules;
 a plurality of switching elements;
 a central control;
 at least one switched voltage converter; and
 a plurality of energy storage units being selected from the group consisting of a capacitor and an accumulator;
 wherein each solar cell module has a voltage output that is coupled to said switched voltage converter via one of said switching elements;
 wherein said central control is configured for sequentially driving said switching elements so that only one solar cell module is coupled to said switched voltage converter at a time; and
 wherein each solar cell module is coupled in parallel to one of said energy storage units.

2. The solar cell device as defined in claim 1, wherein said switched voltage converter is configured as converter selected from the group formed by a flyback converter and a forward converter.

3. The solar cell device as defined in claim 1, wherein said switched voltage converter is configured as an inverting flyback converter.

4. The solar cell device as defined in claim 1, wherein said switched voltage converter comprises at least some of said switching elements and at least some of said solar cell modules.

5. The solar cell device as defined in claim 1, wherein said switched voltage converter is configured as a step-up converter.

6. The solar cell device as defined in claim 1, further comprising a voltage output which is connected in parallel to at least one selected from the group formed by a capacitor and an accumulator.

7. The solar cell device as defined in claim 1, wherein said voltage converter comprises a switching element for tapping a rectified voltage.

8. The solar cell device as defined in claim 7, wherein said switching element is arranged in parallel to a diode; and
 further comprising a control which is configured so that a through switching is effected when said diode is conductive.

9. The solar cell device as defined in claim 1, wherein at least one solar cell module comprises a plurality of interconnected solar cells.

10. The solar cell device as defined in claim 1, wherein said switching elements comprise control inputs that are driven by a central control.

11. The solar cell device as defined in claim 10, wherein said central control is configured for driving said switching elements in response to individual power outputs of said solar cell modules.

12. The solar cell device as defined in claim 11, wherein said central control is configured for controlling a ratio of on-times to off-times of said switching elements.

13. The solar cell device as defined in claim 1, wherein at least one of said solar cell modules comprises a voltage output connected in parallel to a capacitor.

14. The solar cell device as defined in claim 1, wherein at least one switching element is configured as a switching transistor.

15. The solar cell device as defined in claim 14, wherein at least one switching element is configured as a field effect transistor.

16. The solar cell device as defined in claim 1, wherein at least one solar cell is integrated with at least one switching element.

17. A solar cell device comprising:
a plurality of solar cell modules;
a plurality of switching elements;
a central control;
at least one switched voltage converter; and
a plurality of energy storage units being selected from the group consisting of a capacitor and an accumulator;
wherein each solar cell module has a voltage output that is coupled to said switched voltage converter via one of said switching elements by sequential switching so that only one solar cell module is coupled to said switched voltage converter at a time; and
wherein each solar cell module is coupled in parallel to one of said energy storage units.

18. The solar cell device as defined in claim 17, further comprising a switched rectifier;
wherein said switched voltage converter comprises an inductance; and
wherein at least one switching element is connected to said inductance at one end thereof and is coupled to a useful voltage output via said switched rectifier.

19. The solar cell device as defined in claim 18, wherein said switched rectifier is arranged in parallel to a diode and is driven by a control in such a way that the circuit will be through connected when said diode is conductive.

20. A solar cell device comprising:
a plurality of solar cell modules;
a plurality of energy storage units being selected from the group consisting of a capacitor and an accumulator;
each solar cell module having a voltage output that is coupled to one of said energy storage units in parallel and to a switched voltage converter via a sequential switching element so that only one solar cell module is coupled to said switched voltage converter at a time.

21. A solar cell device comprising:
a plurality of solar cell modules;
a plurality of switching elements;
at least one switched voltage converter adapted for connection at an output thereof to an electrical consumer; and
a central controller;
wherein each solar cell module has a voltage output that is coupled to an input of said switched voltage converter via one of said switching elements;
wherein said central controller controls the voltage at the output of said switched voltage converter via a duty cycle control signal supplied to said switched voltage converter, said duty cycle control signal having sequential ON and OFF periods; and
further wherein said central controller couples a selected solar cell module voltage output to said switched voltage converter by enabling its corresponding switching element only during an OFF period of said duty cycle control signal.

22. The solar cell device of claim 21, wherein said central controller sequentially couples each of said plurality of solar cell modules to the input of said switched voltage converter over successive OFF periods of said duty cycle control signal.

23. The solar cell device of claim 21, wherein only one solar cell module is coupled to the input of said switched voltage converter at a time.

24. The solar cell device of claim 23, wherein only one solar cell module is coupled to the input of said switched voltage converter during an OFF period of said duty cycle control signal.

25. The solar cell device of claim 23, wherein said central controller is adapted to detect the voltage output level of each solar cell module when coupled to the input of said switched voltage converter.

26. The solar cell device of claim 25, wherein the values of said detected voltage output levels are stored in a memory associated with said central controller.

27. The solar cell device of claim 26, wherein said central controller controls the relative time period each of said solar cell modules is coupled to the input of said switched voltage converter in accordance with said stored values.

28. The solar cell device of claim 21, wherein said central controller controls the output voltage of the solar cell device by controlling the duty cycle of said duty cycle control signal.

29. The solar cell device of claim 27, further including a plurality of energy storage units selected from the group consisting of a capacitor and an accumulator, and further wherein each solar cell module is coupled in parallel to one of said energy storage units.

* * * * *